US008626682B2

(12) United States Patent
Malik et al.

(10) Patent No.: US 8,626,682 B2
(45) Date of Patent: Jan. 7, 2014

(54) AUTOMATIC DATA CLEANING FOR MACHINE LEARNING CLASSIFIERS

(75) Inventors: Hassan H. Malik, Monmouth Junction, NJ (US); Mans Olof-Ors, Lucerne (CH)

(73) Assignee: Thomson Reuters Global Resources, Baar (CH)

( * ) Notice: Subject to any disclaimer, the term of this patent is extended or adjusted under 35 U.S.C. 154(b) by 278 days.

(21) Appl. No.: 13/046,266

(22) Filed: Mar. 11, 2011

(65) Prior Publication Data

US 2012/0215727 A1   Aug. 23, 2012

Related U.S. Application Data

(60) Provisional application No. 61/445,236, filed on Feb. 22, 2011.

(51) Int. Cl.
*G06F 15/18* (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | |
|---|---|---|---|
| 2002/0111755 A1* | 8/2002 | Valadarsky et al. | 702/58 |
| 2004/0024769 A1 | 2/2004 | Forman et al. | |
| 2006/0282415 A1 | 12/2006 | Shibata et al. | |
| 2008/0162390 A1* | 7/2008 | Kapoor et al. | 706/20 |
| 2010/0332474 A1 | 12/2010 | Birdwell et al. | |
| 2011/0282878 A1 | 11/2011 | Bird et al. | |
| 2012/0197890 A1 | 8/2012 | Franks et al. | |

FOREIGN PATENT DOCUMENTS

| | | |
|---|---|---|
| EP | 1903479 A1 | 3/2008 |
| WO | 03/021421 A1 | 3/2003 |

OTHER PUBLICATIONS

Nigam K et al, "Text Classification from Labeled and Unlabeled Documents using EM", Machine Learning, Kluwer Academic Publishers, Boston, US, vol. 39, No. 2/3, Jan. 1, 2000, pp. 103-134.
Hassan H Malik et al, "Automatic Training Data Cleaning for Text Classification", Data Mining Workshops (ICDMW), 2011 IEEE 11th International Conference on, IEEE, Dec. 11, 2011, pp. 442-449.
US Office Action issued in a related U.S. Appl. No. 13/107,665 dated Oct. 19, 2012.
Hassan H Malik, "Efficient Algorithms for clustering and Classifying High dimensional Text and Discretized Data using Interesting Patterns", submitted in partial fulfillment of the Requirements for the degree of Doctor of Philosophy in the Graduate School of Arts and Sciences, Retrieved from the Internet: URL:http://www.cs.columbia.edu/-hhm2104/papers/Malik thesis.pdf, Dec. 31, 2008.
Hassan H Malik et al, "High Quality,Efficient Hierarchical Document Clustering Using Closed Interesting Itemsets", Data Mining, 2006. ICDM '06. Sixth International Conference on, IEEE, PI, Dec. 1, 2006, pp. 991-996.

(Continued)

*Primary Examiner* — Jeffrey A Gaffin
*Assistant Examiner* — Ola Olude Afolabi
(74) *Attorney, Agent, or Firm* — Bartholomew DiVita; Thomson Reuters (57) ABSTRACT

Systems and techniques for improving the training of machine learning classifiers are disclosed. A classifier is trained using a set of validated documents that are accurately associated with a set of class labels. A subset of non-validated documents is also identified and is used to further train and improve accuracy of the classifier.

27 Claims, 4 Drawing Sheets

(56) References Cited

OTHER PUBLICATIONS

Padmanabhan B et al: "Unexpectedness as a Measure of Interestingness in Knowledge Discovery", Decision Support Systems, Elsevier Science Publishers, Amsterdam, NL, vol. 27, No. 3, Dec. 13, 1997, pp. 303-318.

Hassan H Malik et al, "Exploring the corporate ecosystem with a semi-supervised entity graph", Proceedings of the 20th ACM Conference on Information and Knowledge Management, CIKM 201, Retrieved from the Internet: URL:http://www.cs.columbia.edu/hhm2104/papers/Atlas CIKM 2011.pdf, Oct. 28, 2011, pp. 1857-1866.

Jacobs P S et al, "A friendly merger of conceptual expectations and linguistic analysis in a text processing system," Proceedings of the Conference on Artificial Intelligence Applications. San Diego. Mar. 16-18, 1988; [Proceedings of the Conference on Artificial Intelligence Applications]. Washington. IEEE COMPo Soc. Press. US. vol. Conf. 4,Mar. 14, 1988, pp. 351-356.

Peggy M. Andersen et al, "Automatic Extraction of Facts from Press Releases to Generate News Stories", ANLC '92 Proceedings of the Third Conference on Applied Natural Language Processing, Jan. 1, 1992, pp. 170-177.

Alexander Hogenboom et al, "Semantics-based information extraction for detecting economic events", Multimedia Tools and Applications, Jan. 1, 2012.

Jethro Borsje et al, "Semi-Automatic Financial Events Discovery Based on Lexico-Semantic Patterns", International Journal of Web Engineering and Technology, vol. 6. No. 2, Jan. 1, 2010, pp. 115-140.

Martina Naughton et al, "Investigating Statistical Techniques for Sentence-Level Event Classification", Proceedings of the 22nd International Conference on Computational Linguistics (Coling '08), Aug. 1, 2008, pp. 617-624.

Wang Y-Y et al, "Combination of Statistical and Rule-Based Approaches for Spoken Language Understanding", Proceedings of the International Conference on Spoken LanguageProcessing, XX, XX, Sep. 1, 2002, pp. 609-612.

Hassan H. Malik et al, "Accurate Information Extraction for Quantitative Financial Events", Proceedings of the 20th ACM Conference on Information and Knowledge Management, CIKM 201, Oct. 28, 2011, pp. 2497-2500.

Cooper J W et al, "Detecting Similar Documents Using Salient Terms", CIKM'02; [International Conference on Information Knowledge Management], Virginia, USA, Retrieved from the Internet: URL:http://portal.acm.org/ft_gateway.cfm?id=584835&type=pdf&coll=GUIDE&dl=GUIDE&CFID=95314629&CFTOKEN=916126962002-11-04, pp. 1-6

Toru Takaki et al, "Associative document retrieval by query subtopic analysis and its application to invalidity patent search", Proceedings of the Thirteenth ACM Conference on Information and Knowledge Management. CIKM '04. Jan. 1, 2004, p. 399.

Henning Rode, "From Document to Entity Retrieval", CTIT Ph.D. Thesis Series No. 08-120, University Twente. Netherlands, Retrieved from the Internet: URL:http://doc.utwente.nl/60765/1/thesis HRode.pdf, Dec. 31, 2008.

International Search Report and Written Opinion of the International Searching Authority issued for the related PCT International application No. PCT/US2012/025930 on Aug. 21, 2012.

International Search Report and Written Opinion of the International Searching Authority issued for the related PCT International application No. PCT/US2012/025937 on Jul. 24, 2012.

International Search Report and Written Opinion of the International Searching Authority issued for the related PCT International application No. PCT/US2012/034871 on Oct. 19, 2012.

International Search Report and Written Opinion of the International Searching Authority issued for the related PCT International application No. PCT/US2012/025942 on Jul. 26, 2012.

* cited by examiner

LABEL RETENTION AND ADDITION SCHEMES

1. High Confidence Cluster Neighborhood AND Classification: Retain an existing label or add a label if it exists in both the high-confidence cluster neighborhood and was applied by classifier 2. Cluster Neighborhood and Classification: Retain an existing label or add a label if it exists in both the a cluster neighborhood and was applied by classifier 3. High Confidence Cluster Neighborhood OR Classification: Retain an existing label or add a label if it exists in either the high-confidence cluster neighborhood or was applied by classifier 4. Cluster Neighborhood Only: Retain an existing label or add a label if it exists in either the cluster neighborhood or was applied by classifier

FIG. 3

AUTOMATIC DATA CLEANING FOR MACHINE LEARNING CLASSIFIERS

CROSS-REFERENCE TO RELATED APPLICATIONS

This application claims priority to U.S. Provisional Application No. 61/445,236 filed Feb. 22, 2011, entitled 'Information Processing and Visualization Methods and Systems', the content of which is incorporated herein by reference in its entirety.

TECHNICAL FIELD

This disclosure relates to machine learning, and more particularly to systems and methods for improving accuracy of machine learning classifiers.

BACKGROUND

Today, there is increasing interest in the use of machine learning for analyzing data. Machine learning refers to the design and development of computer algorithms that allow computers to recognize complex patterns and make intelligent decisions based on empirical data.

Typically, a machine learning system that performs text classification on documents includes a classifier. The classifier is provided training data in which each document is already labeled (e.g., identified) with a correct label or class. The labeled document data is used to train a learning algorithm of the classifier which is then used to label/classify similar documents. The accuracy of the classifier is inextricably dependent upon the quality and quantity of correctly labeled documents included in the training data.

Typically, training data for the classifier is derived from experts that manually assign class labels to documents. Manual assignment, however, inherently exhibits a certain level of inconsistency because experts with varying levels of domain knowledge and experience may interpret the same class differently. In addition, the tedious nature of manual assignment can further aggravate the requirement that large amounts of correctly labeled documents be provided to classifiers in order to generalize well. Furthermore, manual assignment of class labels by experts can be an expensive process.

Accordingly, there is a need for improved systems and techniques for generating training data for classifiers.

SUMMARY

Systems and techniques for improving the training of machine learning classifiers are disclosed. A classifier is trained using a set of validated documents that are accurately associated with a set of class labels. A subset of non-validated documents is also identified and is used to further train and improve accuracy of the classifier.

Various aspects of the system relate to generating training data and training classifiers using the generated training data.

For example, according to one aspect, a method of training an initially trained classifier (ITC) that was generated using a set of verified documents associated with a set of class labels is disclosed. The set of verified documents is divided into a training set of documents and a test set of documents, and each class of the set of class labels is associated with a class list. The training set of documents having been further divided into an integer number of verified document sets (INVDS), the method including automatically inputting a set of unverified documents into the ITC, the set of unverified documents divided into an integer number of unverified document sets (UNVDS), and automatically identifying a subset of documents from the set of unverified documents. The method also includes automatically generating a final set of training documents based on the subset of documents and the set of verified documents, and training the ITC using the final set of training documents. The method can also include training a plurality of classifiers using the final set of training documents, and applying the plurality of classifiers to the test set of documents.

In one embodiment, the method further includes executing a first loop code segment including a first loop construct written in a computer programming language, wherein the first loop code segment is executed at run time at least n times, wherein n is a value at run time of a first variable in a first loop termination condition, executing a second loop code segment including a second loop construct written in the computer programming language, wherein the second loop code segment is executed at least p×n times, wherein p is a value at run time of a second variable in a second loop termination condition, and executing a third loop code segment comprising a third loop construct written in the computer programming language, wherein the third loop code segment is executed p×n×q times, wherein q is a value at run time of a third variable in a third loop termination condition.

In one embodiment, for each of the n times the first loop code is executed, the method includes assigning a first portion of the INVDS to a first set of documents, assigning a second portion of the INVDS to a second set of documents, the first portion different from the second portion, and training the ITC for each class associated with the set of class labels using documents in the first set of documents. The method also includes applying a plurality of classifiers to the documents in the second set of documents, and computing a first set of F1 scores associated with documents in the second set of documents. The first set of documents and the second set of documents may have no documents in common.

In another embodiment, for each of the p times the second loop code is executed, the method includes applying at least one profile of a set of profiles to each document of the UNVDS, the at least one profile defining a rule to be applied to each document of the UNVDS, comparing at least one document of the UNVDS to all of the documents included in the first set of documents, and deleting the at least one document from the UNVDS based on the comparison. The rule may include a class label retention scheme, a class label addition scheme, or a combination thereof.

The method can include applying a plurality of profiles included in the set of profiles to each document of the UNVDS in a decreasing order of profile strictness. In addition, in one embodiment, if the at least one document from the UNVDS is similar to any of the documents included in the first set of documents, the at least one document from the UNVDS is deleted. Comparing the at least one document can include computing a cosine similarity for the at least one document.

In yet another embodiment, for each of the p times the second loop code is executed, the method includes forming a third set of documents by merging documents included in the first set of documents with documents not deleted from the UNVDS, and clustering the third set of documents using a clustering algorithm.

The method can also include, for each of the q times the third loop code is executed, applying the ITC to all documents in the UNVDS for each class defined in the set of class labels, forming a subset of documents from the UNVDS, each document of the subset of documents having at least one class associated therewith, training a second classifier using documents in the subset of documents and the first set of documents, and applying the second classifier to the second set of documents.

In one embodiment, the method further includes computing a second set of F1 scores associated with documents in the second set of documents, comparing an F1 score associated with a class label from the second set of F1 scores to a corresponding F1 score associated with the class label from the first set of F1 scores, updating a best score for the class label based on the comparison, and adding documents from the subset of documents to the list of class labels based on the comparison.

A system, as well as articles that include a machine-readable medium storing machine-readable instructions for implementing the various techniques, are disclosed. Details of various embodiments are discussed in greater detail below.

Additional features and advantages will be readily apparent from the following detailed description, the accompanying drawings and the claims.

BRIEF DESCRIPTION OF THE DRAWINGS

Like reference symbols in the various drawings indicate like elements.

DETAILED DESCRIPTION

The present invention includes methods and systems which facilitate automatic data cleansing (e.g., removal of noise, inconsistent data and errors) of data for training classifiers. In particular, methods and systems for optimizing the amount of training data available to train an initially trained classifier (ITC) are disclosed. The present invention is particularly beneficial in scenarios in which training data is limited, which can have a significant effect on the accuracy of a classifier.

It is known that data cleansing of training data often yields higher accuracy gains than improvements in machine learning algorithms. This invention is useful by providing gains in classifier accuracy as a result of training on larger sets of cleaner data. Decreased production costs can also be obtained by not requiring experts to manually assign class labels to all training documents. Advantageously, the present invention can be used with different types of classifiers and domains as a general purpose method to be used when developing and training machine learning classifiers.

The following definitions are provided to facilitate understanding of the disclosure and are standard machine learning terms.

As used herein, the term "classifier" refers to a software component that accepts unlabeled documents as inputs and returns discrete classes. Classifiers are trained on labeled documents prior to being used on unlabeled documents.

As used herein, the term "training" refers to the process by which a classifier generates models and/or patterns from a training data set. A training data set comprises documents that have been mapped (e.g., labeled) to "known-good" classes.

As used herein, the term "document" refers to a set of information input into a classifier. Example documents include, but are not limited to, electronic files and records.

As used herein, the term "class" refers to a discrete category with which a document is associated. The classifier's function is to predict the discrete category (e.g., label, class) to which a document belongs.

As used herein, the term "labeling" refers to the process of associating a document to a set of correct classes.

As used herein, the term "accuracy" refers to the rate of correct or incorrect labeling performed by a classifier over a test data set.

Figure 1:
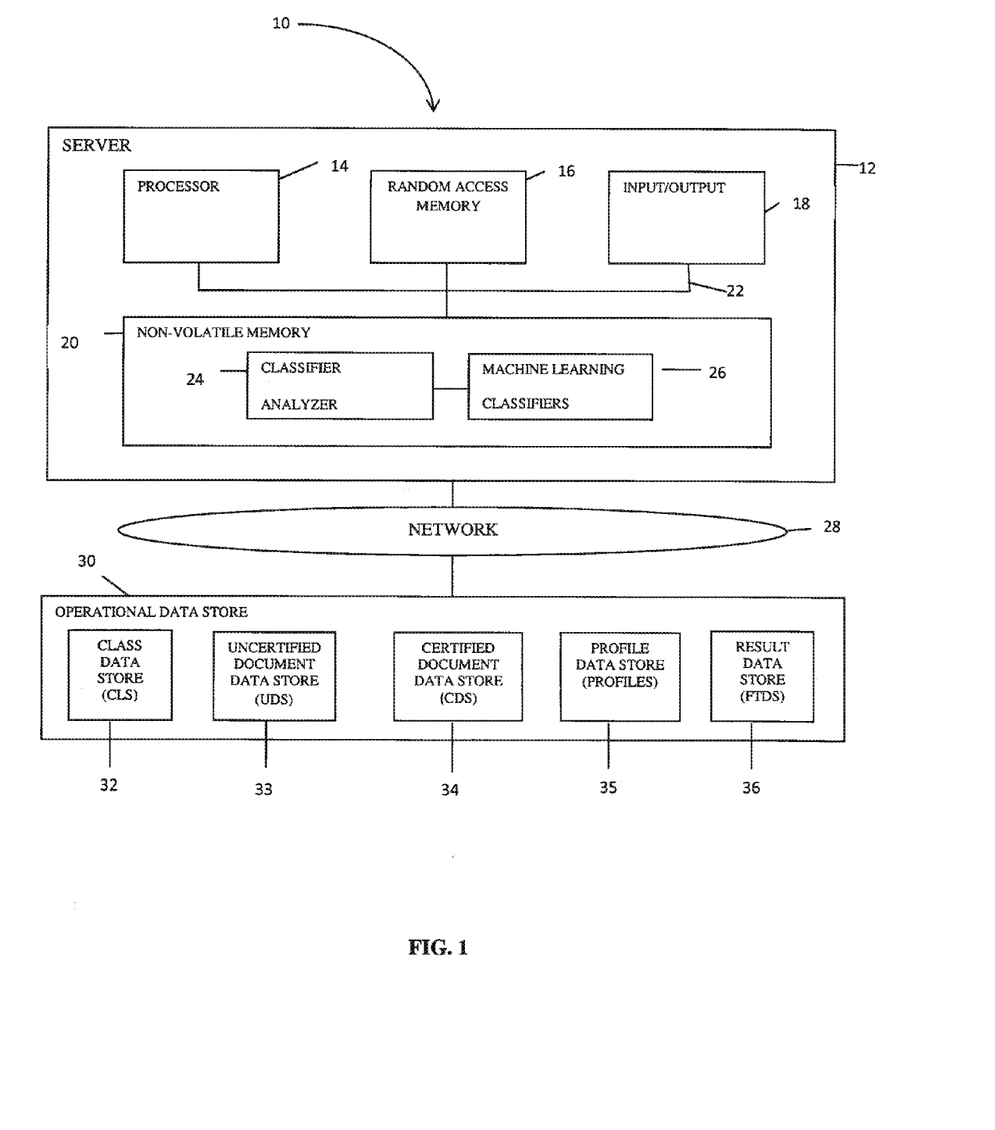
FIG. 1 is a schematic of an exemplary computer-based classifier system according to one embodiment of the present invention.

As used herein, the phrase "test data" refers to a data set used for estimating accuracy. Turning now to FIG. 1, an example of a suitable computing system 10 within which embodiments of the present invention may be implemented is disclosed. The computing system 10 is only one example and is not intended to suggest any limitation as to the scope of use or functionality of the invention. Neither should the computing system 10 be interpreted as having any dependency or requirement relating to any one or combination of illustrated components.

For example, the present invention is operational with numerous other general purpose or special purpose computing consumer electronics, network PCs, minicomputers, mainframe computers, laptop computers, as well as distributed computing environments that include any of the above systems or devices, and the like.

The invention may be described in the general context of computer-executable instructions, such as program modules, being executed by a computer. Generally, program modules include routines, programs, objects, components, data structures, loop code segments and constructs, etc. that perform particular tasks or implement particular abstract data types. The invention can be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

In one embodiment, with reference to FIG. 1, the system 10 includes a server device 12 configured to include a processor 14, such as a central processing unit ('CPU'), random access memory ('RAM') 16, one or more input-output devices 18, such as a display device (not shown) and keyboard (not shown), and non-volatile memory 20, all of which are interconnected via a common bus 22 and controlled by the processor 14. As shown in the FIG. 1 example, in one embodiment, the non-volatile memory 20 is configured to include a classifier analyzer 24 for generating a set of training documents, and one or more machine learning classifiers 26 that are trained using the generated set of training documents. In one embodiment, the machine learning classifiers are binary text classifiers. Additional details of the classifier module 24 and machine learning classifiers 26 are discussed in greater detail below.

The network 28 can include various devices such as routers, server, and switching elements connected in an Intranet, Extranet or Internet configuration. In one embodiment, the network 28 uses wired communications to transfer information between an access device (not shown), the server device 12, and an operational data store 30. In another embodiment, the network 28 employs wireless communication protocols to transfer information between the access device, the server device 12, and operational data store 30. In yet other embodiments, the network employs a combination of wired and wireless technologies to transfer information between the access device, the server device 12, and the operational data store 30.

The operational data store 30 is a repository that maintains and stores information utilized by the classifier analyzer 24 and the machine learning classifiers 26. In one embodiment, the operational data store 30 is a relational database. In another embodiment, the operational data store 30 is a directory server, such as a Lightweight Directory Access Protocol ('LDAP'). In yet another embodiment, the operational data store 30 is an area of non-volatile memory 20 of the server 12.

As shown in FIG. 1, in one embodiment, the operational data store 30 includes a class data store (CLS) 32 that stores an taxonomy of class labels that are used in classifying a document into one or more discrete categories. An uncertified document data store (UDS) 33 is also provided that includes a set of documents having zero (0) or more class labels associated with each document, and which has not been independently validated by an expert, and a certified document data store (CDS) 34 that includes a set of documents having one (1) or more class labels associated with each document and which has been independently verified by an expert.

As shown in the FIG. 1 example, the operational data store 30 is also configured to maintain and store a profile data store (PROFILES) 35 that include profiles defining rules/schemas for adding and retaining class labels associated with documents, and a result data store (FTDS) 36 that includes training data generated by the classifier analyzer 24 by combining documents stored in the CDS 34 with a select subset of documents stored in the UDS 33. Additional details of each of these data stores 32-36 are discussed in connection with FIGS. 2A-B.

Although the operational data store 30 shown in FIG. 1 is connected to the network 28, it will be appreciated by one skilled in the art that the operational data store 30 and/or any of the data stores 32-36 shown in FIG. 1, can be distributed across various servers and be accessible to the server 12 over the network 28, be coupled directly to the server 12, or be configured in an area of non-volatile memory 20 of the server 12.

Further, it should be noted that the system 10 shown in FIG. 1 is one embodiment of the disclosure. Other system embodiments of the disclosure may include additional structures that are not shown, such as secondary storage and additional computational devices. In addition, various other embodiments of the disclosure include fewer structures than those shown in FIG. 1. For example, in one embodiment, the disclosure is implemented on a single computing device in a non-networked standalone configuration. Data input is communicated to the computing device via an input device, such as a keyboard and/or mouse. Data output of the system is communicated from the computing device to a display device, such as a computer monitor.

Figure 2A:
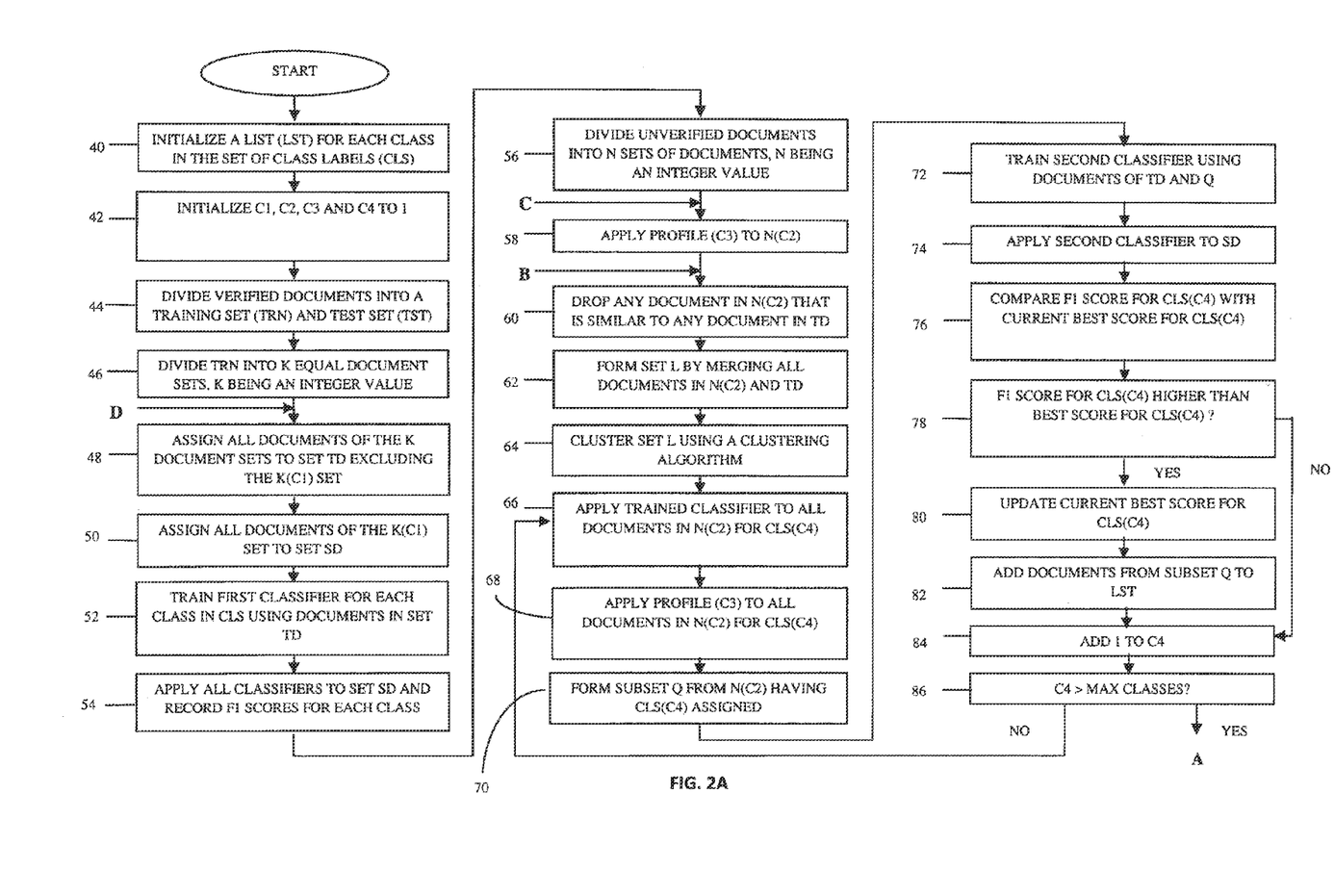
FIGS. 2A-B illustrate an exemplary method of improving training data for classifiers according to one embodiment of the present invention
Figure 2B:
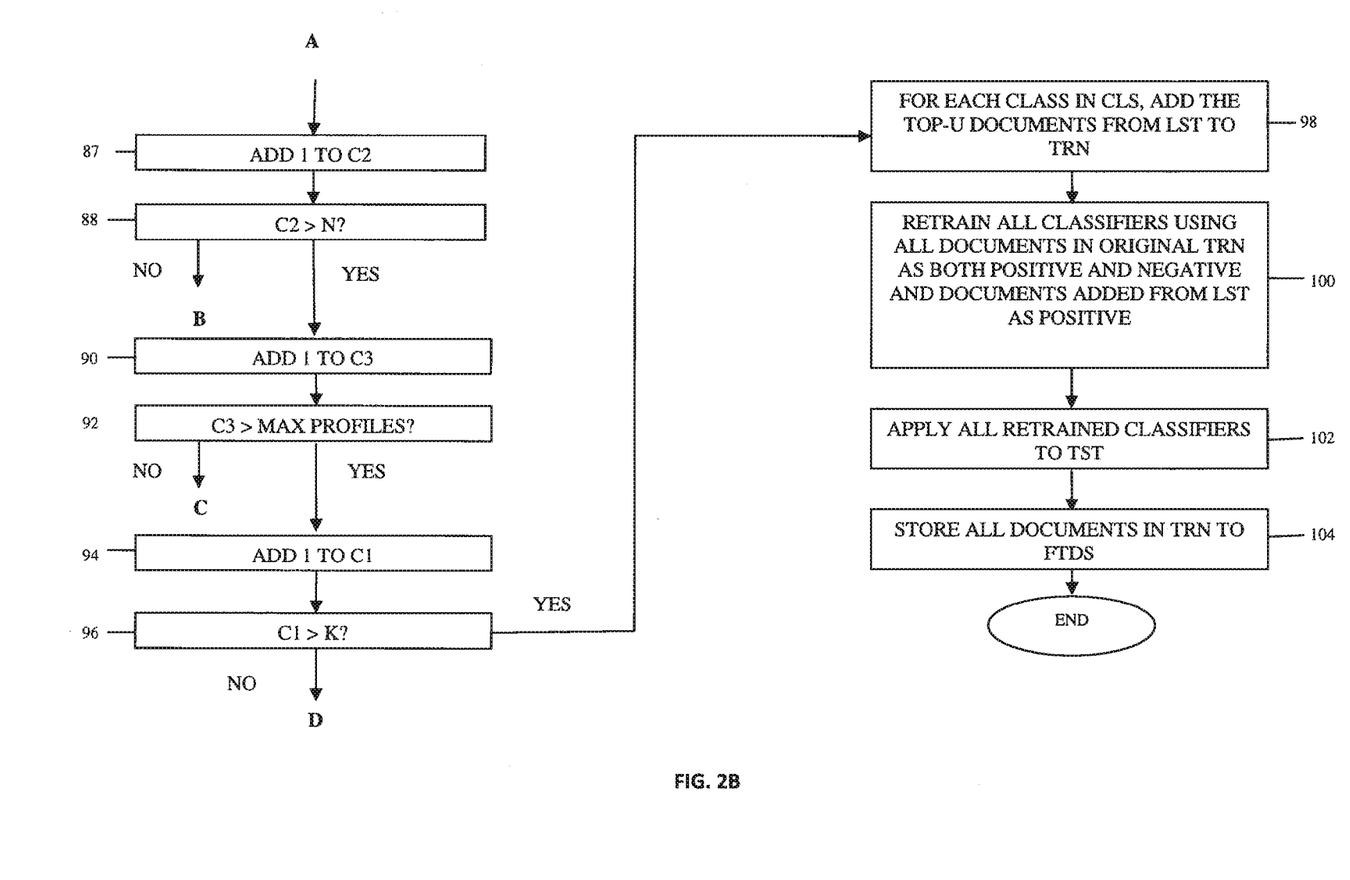

Referring now to FIGS. 2A-B, a computer-implemented method for training an initially trained classifier (ITC) using a set of training documents generated by the classifier analyzer 24 is disclosed. The method includes executing a plurality of loop code segments that include loop constructs written in a computer programming language. Each of the loop code segments is executed at run time a number of times based on a value at run time of variables included in corresponding loop termination conditions. In one embodiment, the method is implemented using three loop code segments and corresponding loop termination conditions. In another embodiment, as set forth below, the method is implemented using four loop code segments with corresponding loop termination conditions.

For example, in one embodiment, as shown at step 40 of FIG. 2A, the classifier analyzer 24 initializes a list of document candidates (LST) for each class defined in the CLS data store 32. The document list LST is used by the classifier analyzer 24 to store document candidates that are to be added to training data. At initialization, the LST includes no documents. Next, at step 42, the classifier analyzer 24 initializes a plurality of counter variables C1, C2, C3 and C4 to a value of one (1). Each of the plurality of counter variables C1, C2, C3, C4 is used to determine the number of times loop code segments are to be executed. Once counter variable and list initializations are complete, at step 44, the classifier analyzer 24 divides documents included in the CDS data store 34 into a training set (TRN) and a test set (TST) of documents. The TRN data set includes documents that have been accurately labeled to known-group classes and the TST data set includes documents that are used for estimating accuracy of machine learning classifiers trained on the TRN data set. In one embodiment, the classifier analyzer 24 randomly splits the set of documents into the TRN and TST set of documents based on a user-defined percentage associated with the TRN and TST set of documents, respectively.

Next, at step 46, the classifier analyzer 24 divides the TRN data set into a plurality of K document sets, where K is an integer value. In one embodiment, the number of documents included in each of the K document sets is approximately equal. Once the TRN data set is divided into K document sets, at step 48, the classifier analyzer 24 assigns all documents of the K document sets to a total document set (TD) excluding one of the documents sets referenced by counter variable C1, hereinafter referred to as the K(C1) data set. Next, at step 50, the classifier analyzer 24 assigns the K(C1) data set to a single document set (SD).

Next, at step 52, a first classifier of the machine learning classifiers 26 is trained for each class in the CLS data store 32 using documents in the TD set. The classifier analyzer 24, at step 54, next applies all machine learning classifiers 26 to the SD set of documents. In one embodiment, the classifier analyzer 24 computes and records F1 scores (e.g., a measure of a test's accuracy that considers both the precision (p) and recall (r) of the test, as known in the art) for each class determined. Once the machine learning classifiers 26 are trained, at step 56, the classifier analyzer 24 divides documents from the UDS 33 into N data sets of UDS documents, where N is an integer value.

Once documents from the UDS 33 are divided into N data sets, the classifier analyzer 24, at step 58, applies a plurality of label retention and addition rules/schemes accessed from the PROFILES data store 35 to one of the N data sets. The particular N data set is identified based on the value stored in counter variable C2, hereinafter referred to as N(C2), and the particular label retention and addition rule/scheme applied to the N data set is based on the value of counter variable C3. Each rule is associated with a criterion that if met, triggers the rule. In one embodiment, the rules are applied to the N data set based on a descending order of strictness (e.g., criteria that must be met).

Figure 3:
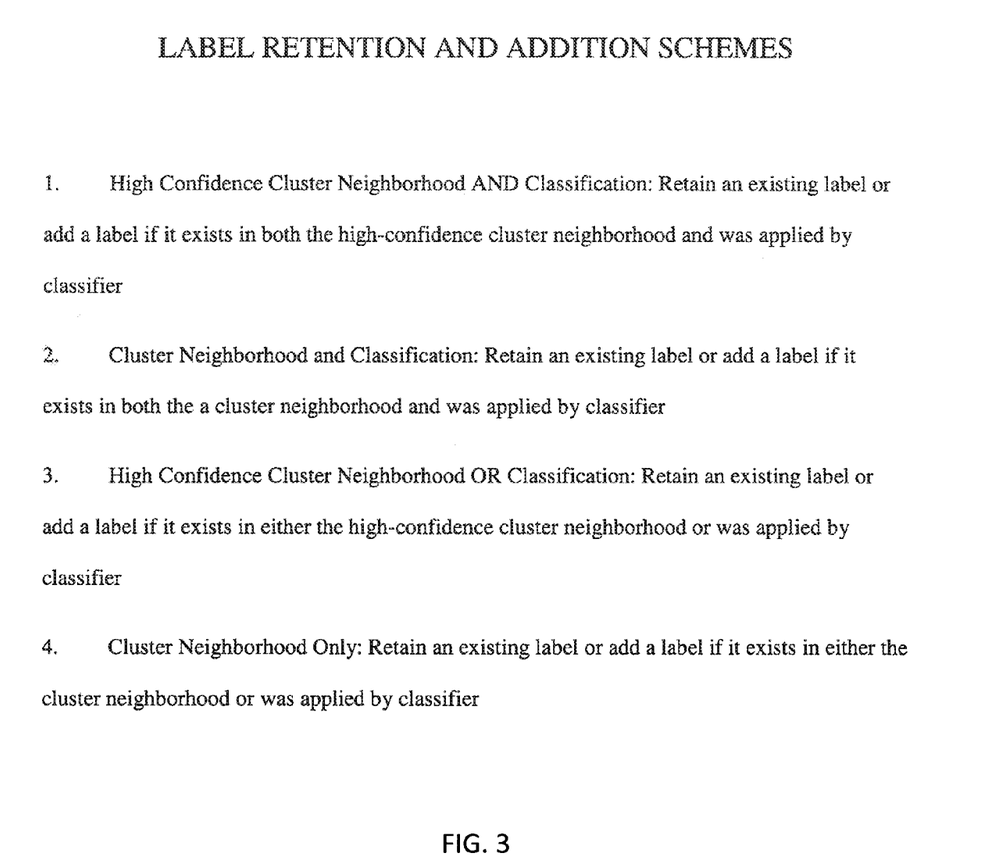
FIG. 3 is an example of label retention and addition schemes according to one embodiment of the present invention.

Example label retention and addition schemes are shown in connection with FIG. 3. These schemes add or retain labels by considering how well the existing labeled data predicts classes for each unlabeled document. The phrase "cluster neighborhood" refers to a set of documents that appear in any cluster. An unlabeled document is considered part of a "high-confidence" cluster neighborhood for a class "c" if it is clustered with at-least K labeled documents that belong to class "c." Other clustering algorithm specific criteria are also possible for considering a cluster neighborhood as "high-confidence."

For example, the criteria for the scheme shown in FIG. 3 item 1 requires that in order to retain a class label "c" that is already assigned to an unlabeled document "d", or to add class label "c" to unlabeled document "d", document "d" must appear in the "high-confidence" neighborhood for "c" and be assigned with class label "c" by a classifier trained on labeled data. The criteria for the scheme shown in FIG. 3 item 2 requires that in order to retain a class label "c" that is already assigned to an unlabeled document "d", or to add class label "c" to unlabeled document "d", document "d" must appear in at least one cluster that also contains at least one existing document that is labeled with "c", and be assigned with class label "c" by a classifier trained on labeled data.

Referring back to FIG. 2A, at step 60, the classifier analyzer 24 removes any document in the N(C2) data set that is similar to any document in the TD data set. In one embodiment, the classifier analyzer 24 applies cosine similarity to determine document similarity and removes any document from the N(C2) data set where the computed cosine value equals or exceeds a pre-determined value. The classifier analyzer 24, at step 62, then forms a new set L of documents by merging all remaining documents in the N(C2) data set with the TD data set. In one embodiment, at step 64, the classifier analyzer 24 then clusters the set L of documents using a clustering algorithm. Various clustering techniques known in the art can be used to cluster the set L of documents.

Next, at step 66, the first classifier of the machine learning classifiers 26 is trained on all remaining documents of the N(C2) data set associated with a class in the CLS data store 32, which is referenced by a value stored in the C4 variable. At step 68, the classifier analyzer 24 then applies label retention and addition rules/schemes accessed from the PROFILES data store 35 to all documents in the N(C2) data set for the associated class.

Once the label retention and addition rules have been applied, at step 70, the classifier analyzer 24 forms a Q document data store from a subset of the N(C2) data set where the class, referenced by the C4 variable, has been assigned. At step 72, a second classifier of the machine learning classifiers 26 is then trained using documents of the TD data set and the Q document data store. Next, at step 74, the second classifier of the machine learning classifiers 26 is applied to the SD data set and an F1 score for the class in the CLS data store 32 referenced by the value C4 is computed by the classifier analyzer 24.

At step 76, the classifier analyzer 24 compares the computed F1 score for the class referenced by the value C4 with a current best score for the class. If the classifier analyzer 24 determines that the computed F1 score for the class is higher than a previously stored best score for the class, as shown in step 78, the classifier analyzer 24 updates the best score value for the class, as indicated in step 80, adds documents from the Q document data store to the list of document candidates LST, as indicated in step 82, and then increments C4, as indicated in step 84.

Next, at step 86, a first loop termination condition is evaluated. The classifier analyzer 24 determines whether the value store in counter variable C4 is greater than the total number of classes stored in the CLS data store 32. If the value of counter variable C4 is not greater than the total number of classes, steps 66-86 of the above described method are repeated in a first loop code segment. Otherwise, as shown at step 87, the classifier analyzer 24 increments C2.

Next, at step 88, a second loop termination condition is evaluated. The classifier analyzer 24 determines whether the value stored in the counter variable C2 is greater than the number of N data sets. If the value of counter variable C2 is not greater than the number of N data sets, steps 60-88 of a second loop code segment are repeated. Otherwise, if the value of the C2 variable exceeds the number of N data sets, at step 90, the classifier analyzer 24 increments C3.

Next, at step 92, the classifier analyzer 24 compares the value of variable C3 to a total number of label retention and addition rules/schemes stored in the PROFILES data store 35. If the value of counter variable C3 does not exceed the total number of label retention and addition rules/schemes stored in the PROFILES data store 35, steps 58-92 of a third loop code segment are repeated. Otherwise, if the value of the counter variable C3 exceeds the total number of label retention and addition rule/schemes, as shown at step 94, the classifier analyzer 24 increments C1, and determines at step 96 whether the value of counter variable C1 exceeds the total number of K data sets. If the value of counter variable C1 does not exceed the total number of K data sets, steps 48-96 of a fourth loop code segment are repeated.

Otherwise, at step 98, for each class defined in the CLS data store, a predetermined number of documents are added to the TRN data set. For example, in one embodiment, the top 20 documents from the list of document candidates LST are added to the TRN data store. Next, at step 100, all machine learning classifiers are retrained using all of the documents in the original TRN data set as both positive and negative documents and documents identified from the LST data store as being positive. The positive and negative documents for a class "c" are used by machine learning classifiers to generate a model that is likely to assign class "c" to unlabeled documents that match more characteristics of documents that were marked as positive for "c", and less characteristics of documents that were marked as negative for "c." All retrained machine learning classifiers 26 are then applied to the TST data store, as indicated in step 102. Lastly, as indicated in step 104, the classifier analyzer 24 stores all documents in the TRN data set in the FTDS 104 for subsequent use by the machine learning classifiers 26.

Various features of the system may be implemented in hardware, software, or a combination of hardware and software. For example, some features of the system may be implemented in one or more computer programs executing on programmable computers. Each program may be implemented in a high level procedural or object-oriented programming language to communicate with a computer system or other machine. Furthermore, each such computer program may be stored on a storage medium such as read-only-memory (ROM) readable by a general or special purpose programmable computer or processor, for configuring and operating the computer to perform the functions described above.

What is claimed is:

1. A method of training an initially trained classifier (ITC), the ITC having been generated using a set of verified documents associated with a set of class labels, the set of verified documents having been divided into a training set of documents and a test set of documents, and each class of the set of class labels associated with a class list, the training set of documents having been further divided into an integer number of verified document sets (INVDS), the method comprising:

automatically inputting a set of unverified documents into the ITC, the set of unverified documents divided into an integer number of unverified document sets (UNVDS);

automatically identifying a subset of documents from the UNVDS;

automatically generating a final set of training documents based on the subset of documents and the INVDS;

clustering at least one subset of documents from the INVDS and one subset of documents from the UNVDS using a flat clustering or hierarchical clustering technique; and training the ITC using the final set of training documents.

2. The method of claim 1, further comprising:

executing a first loop code segment comprising a first loop construct written in a computer programming language, wherein the first loop code segment is executed at run time at least n times, wherein n is a value at run time of a first variable in a first loop termination condition;

executing a second loop code segment comprising a second loop construct written in the computer programming language, wherein the second loop code segment is executed at least p×n times, wherein p is a value at run time of a second variable in a second loop termination condition; and executing a third loop code segment comprising a third loop construct written in the computer programming language, wherein the third loop code segment is executed p×n×q times, wherein q is a value at run time of a third variable in a third loop termination condition.

3. The method of claim 2, further comprising, for each of the n times the first loop code is executed:

assigning a first portion of the INVDS to a first set of documents;

assigning a second portion of the INVDS to a second set of documents, the first portion different from the second portion;

training the ITC for each class associated with the set of class labels using documents in the first set of documents;

applying a plurality of classifiers to the documents in the second set of documents; and computing a first set of F1 scores associated with documents in the second set of documents.

4. The method of claim 3, wherein the first set of documents and the second set of documents have no documents in common.

5. The method of claim 2, further comprising, for each of the p times the second loop code is executed:

applying at least one profile of a set of profiles to each document of the UNVDS, the at least one profile defining rule to be applied to each document of the UNVDS;

comparing at least one document of the UNVDS to all of the documents included in the first set of documents; and deleting the at least one document from the UNVDS based on the comparison.

6. The method of claim 5, wherein the rule defines one of a class label retention scheme, class label addition scheme, or combination thereof.

7. The method of claim 5, comprising applying a plurality of profiles included in the set of profiles to each document of the UNVDS in a decreasing order of profile strictness.

8. The method of claim 5, wherein the at least one document from the UNVDS is deleted if the at least one document from the UNVDS is similar to any of the documents included in the first set of documents.

9. The method of claim 5, wherein comparing the at least one document comprises computing a cosine similarity for the at least one document.

10. The method of claim 5, further comprising, for each of the p times the second loop code is executed:

forming a third set of documents by merging documents included in the first set of documents with documents not deleted from the UNVDS ; and clustering the third set of documents using the flat clustering or the hierarchical clustering technique.

11. The method of claim 2, further comprising, for each of the q times the third loop code is executed:

applying the ITC to all documents in the UNVDS for each class defined in the set of class labels;

forming the subset of documents from the UNVDS, each document of the subset of documents having at least one class associated therewith;

training a second classifier using documents in the subset of documents and the first set of documents;

applying the second classifier to the second set of documents;

computing a second set of F1 scores associated with documents in the second set of documents;

comparing an F1 score associated with a class label from the second set of F1 scores to a corresponding F1 score associated with the class label from the first set of F1 scores;

updating a best score for the class label based on the comparison; and adding documents from the subset of documents to a list of candidate documents based on the comparison.

12. The method of claim 11, wherein generating the final set of training documents comprises adding at least one document associated with the list of candidate documents to the training set of documents.

13. The method of claim 1, further comprising:

training a plurality of classifiers using the final set of training documents; and applying the plurality of classifiers to the test set of documents.

14. A system comprising:

a data store including a set of verified documents and a set of unverified documents, the set of verified documents divided into a training set of documents and a test set of documents, the training set of documents divided into an integer number of verified document sets (INVDS), and the set of unverified documents divided into an integer number of unverified document sets (UNVDS);

a server including a processor and memory operatively coupled to the data store, the memory storing instructions that, in response to receiving a request for access to a service, cause the processor to:

automatically identify a subset of documents from the UNVDS in response to inputting the set of unverified documents into an initially trained classifier (ITC);

automatically generate a final set of training documents based on the subset of documents and the INVDS;

clustering at least one subset of documents from the INVDS and one subset of documents from the UNVDS using a flat clustering or hierarchical clustering technique; and train the ITC using the final set of training documents.

15. The system of claim 14, wherein the memory stores instructions that, in response to receiving the request, cause the processor to:

execute a first loop code segment comprising a first loop construct, wherein the first loop code segment is executed at run time at least n times, wherein n is a value at run time of a first variable in a first loop termination condition;

execute a second loop code segment comprising a second loop construct, wherein the second loop code segment is executed at least p×n times, wherein p is a value at run time of a second variable in a second loop termination condition; and execute a third loop code segment comprising a third loop construct, wherein the third loop code segment is executed p×n×q times, wherein q is a value at run time of a third variable in a third loop termination condition.

16. The system of claim 15, wherein the memory stores instructions that, for each of the n times the processor executes the first loop, cause the processor to:

assign a first portion of the INVDS to a first set of documents;

assign a second portion of the INVDS to a second set of documents, the first portion different from the second portion;

train the ITC for each class associated with the set of class labels using documents in the first set of documents;

apply a plurality of classifiers to the documents in the second set of documents; and compute a first set of F1 scores associated with documents in the second set of documents.

17. The system of claim 16, wherein the first set of documents and the second set of documents have no documents in common.

18. The system of claim 15, wherein the memory stores instructions that, for each of the p times the second loop code is executed, cause the processor to:

apply at least one profile of a set of profiles to each document of the UNVDS, the at least one profile defining a rule to be applied to each document of the UNVDS;

compare at least one document of the UNVDS to all of the documents included in the first set of documents; and delete the at least one document from the UNVDS based on the comparison.

19. The system of claim 18, wherein the rule defines a class label retention scheme, class label addition scheme, or combination thereof.

20. The system of claim 18, wherein the memory stores instructions that cause the processor to apply a plurality of profiles included in the set of profiles to each document of the UNVDS in a decreasing order of profile strictness.

21. The system of claim 18, wherein the memory stores instructions that cause the processor to delete the at least one document from the UNVDS if the at least one document from the UNVDS is similar to any of the documents included in the first set of documents.

22. The system of claim 18, wherein the memory stores instructions that cause the processor to compute a cosine similarity for the at least one document to be used during the comparison.

23. The system of claim 18, wherein the memory stores instructions that, for each of the p times the second loop code is executed, cause the processor to:

form a third set of documents by merging documents included in the first set of documents with documents not deleted from the UNVDS; and cluster the third set of documents using the flat clustering or hierarchical clustering technique.

24. The system of claim 15, wherein the memory stores instructions that, for each of the q times the third loop code is executed, cause the processor to:

apply the ITC to all documents in the UNVDS for each class defined in the set of class labels;

form the subset of documents from the UNVDS, each document of the subset of documents having at least one class associated therewith;

train a second classifier using documents in the subset of documents and the first set of documents;

apply the second classifier to the second set of documents;

compute a second set of F1 scores associated with documents in the second set of documents;

compare an F1 score associated with a class label from the second set of F1 scores to a corresponding F1 score associated with the class label from the first set of F1 scores;

update a best score for the class label based on the comparison; and add documents from the subset of documents to a list of candidate documents based on the comparison.

25. The system of claim 24, wherein the memory stores instructions that, in response to receiving the request, cause the processor to add at least one document associated with the list of candidate documents to the training set of documents to form the final set of training documents.

26. The system of claim 14, wherein the memory stores instructions that, in response to receiving the request, cause the processor to:

train a plurality of classifiers using the final set of training documents; and apply the plurality of classifiers to the test set of documents.

27. An article comprising a non-transitory machine-readable medium storing machine-readable instructions that, when applied to the machine, cause the machine to:

automatically identify a subset of documents from an integer number of unverified document sets (UNVDS) in response to inputting the UNVDS into an initially trained classifier (ITC);

automatically generate a final set of training documents based on the subset of documents and the INVDS;

clustering at least one subset of documents from the INVDS and one subset of documents from the UNVDS using a flat clustering or hierarchical clustering technique; and train the ITC using the final set of training documents.

* * * * *